United States Patent
Lopatic

(10) Patent No.: US 8,813,041 B2
(45) Date of Patent: Aug. 19, 2014

(54) EFFICIENT COMPRESSION OF APPLICATIONS

(75) Inventor: Thomas Lopatic, Berlin (DE)

(73) Assignee: Yahoo! Inc., Sunnyvale, CA (US)

( * ) Notice: Subject to any disclaimer, the term of this patent is extended or adjusted under 35 U.S.C. 154(b) by 1288 days.

(21) Appl. No.: 12/031,544

(22) Filed: Feb. 14, 2008

(65) Prior Publication Data

US 2009/0210856 A1 Aug. 20, 2009

(51) Int. Cl.
*G06F 9/44* (2006.01)
*G06F 9/45* (2006.01)

(52) U.S. Cl.
USPC .......................... 717/130; 717/158; 717/159

(58) Field of Classification Search
None
See application file for complete search history.

(56) References Cited

U.S. PATENT DOCUMENTS

| | | | | |
|---|---|---|---|---|
| 5,421,016 A * | 5/1995 | Conner et al. | | 717/146 |
| 5,752,038 A * | 5/1998 | Blake et al. | | 717/158 |
| 5,920,723 A * | 7/1999 | Peyton et al. | | 717/159 |
| 5,966,702 A * | 10/1999 | Fresko et al. | | 1/1 |
| 6,163,780 A * | 12/2000 | Ross | | 1/1 |
| 6,263,491 B1 * | 7/2001 | Hunt | | 717/130 |
| 6,336,122 B1 * | 1/2002 | Lee et al. | | 1/1 |
| 6,339,841 B1 * | 1/2002 | Merrick et al. | | 717/166 |
| 6,349,344 B1 * | 2/2002 | Sauntry et al. | | 719/332 |
| 6,366,898 B2 * | 4/2002 | Taivalsaari et al. | | 1/1 |
| 6,381,735 B1 * | 4/2002 | Hunt | | 717/158 |
| 6,536,035 B1 * | 3/2003 | Hawkins | | 717/100 |
| 6,633,892 B1 * | 10/2003 | Chan et al. | | 1/1 |
| 6,634,022 B1 * | 10/2003 | Leermakers | | 717/158 |
| 6,658,492 B1 * | 12/2003 | Kawahara et al. | | 719/332 |
| 6,732,108 B2 * | 5/2004 | Factor et al. | | 1/1 |
| 6,856,994 B2 * | 2/2005 | Dickey | | 1/1 |
| 6,944,754 B2 * | 9/2005 | Zilles et al. | | 717/159 |
| 6,957,422 B2 * | 10/2005 | Hunt | | 717/130 |
| 6,959,300 B1 * | 10/2005 | Caldwell et al. | | 707/999.101 |
| 7,058,936 B2 * | 6/2006 | Chilimbi et al. | | 717/158 |
| 7,093,242 B2 * | 8/2006 | Bernadat et al. | | 717/166 |
| 7,117,293 B1 * | 10/2006 | Graziano et al. | | 711/100 |
| 7,140,008 B2 * | 11/2006 | Chilimbi et al. | | 717/158 |

(Continued)

FOREIGN PATENT DOCUMENTS

KR 10-0319755 1/2002

OTHER PUBLICATIONS

Bradley, et al., "JAZZ: An efficient Compressed Format for Java Archive Files", 1998, Proceedings of Conference of CASCR; [retrieved on Nov. 7, 2011]; Retrieved from Internet <URL:http://dl.acm.org/citation.cfm?id=783167>; pp. 1-9.*

(Continued)

*Primary Examiner* — Xi D Chen
(74) *Attorney, Agent, or Firm* — Weaver Austin Villeneuve & Sampson LLP

(57) ABSTRACT

In one embodiment, a method for inserting advertising into an application includes removing first application code from a first input executable file and placing it into an output executable file, wherein the first application code represents code part of the application. Then a first set of proxies is inserted into the first input executable file, wherein the first set of proxies, when run, makes calls to the first application code. Second application code is added into the output executable file, wherein the second application code represents code executable to display the advertising. The output executable file is compressed. Then, the first input executable file and the output executable file are provided to a device such that the device may load and execute the files.

22 Claims, 5 Drawing Sheets

(56) References Cited

U.S. PATENT DOCUMENTS

| | | | |
|---|---|---|---|
| 7,243,346 B1* | 7/2007 | Seth et al. | 717/163 |
| 7,275,243 B2* | 9/2007 | Gibbons et al. | 717/159 |
| 7,389,515 B1* | 6/2008 | Seth et al. | 719/320 |
| 7,415,712 B2* | 8/2008 | Hunt | 717/159 |
| 7,493,630 B2* | 2/2009 | Hunt | 717/130 |
| 7,720,878 B2* | 5/2010 | Caldwell et al. | 707/803 |
| 7,725,887 B2* | 5/2010 | Wu et al. | 717/159 |
| 7,761,861 B2* | 7/2010 | Bentz et al. | 717/147 |
| 7,984,429 B2* | 7/2011 | Hunt | 717/130 |
| 8,046,752 B2* | 10/2011 | Chilimbi et al. | 717/158 |
| 2003/0033310 A1* | 2/2003 | Factor et al. | 707/100 |
| 2006/0206886 A1 | 9/2006 | Yu et al. | |
| 2007/0174490 A1 | 7/2007 | Choi et al. | |
| 2007/0220494 A1* | 9/2007 | Spooner | 717/130 |
| 2008/0294525 A1* | 11/2008 | Walk et al. | 705/14 |
| 2013/0125103 A1* | 5/2013 | Odaira | 717/158 |

OTHER PUBLICATIONS

David Hovemeyer, "Bundling: a hybrid approach", 2001, published online; [retrieved on Nov. 7, 2011]; Retrieved from Internet <URL:http://www.usenix.org/event/jvm01/full_papers/hovemeyer/hovemeyer_html/node10.html>; pp. 1-1.*

Kristofer Karlsson, "Methods for Reducing Distribution Size for J2ME Applications", 2008; Royal Institute of Technology, School of Computer Science and Communication; [retrieved on Nov. 7, 2011]; Retrieved from Internet <URL:http://kiosk.nada.kth.se/utbildning/grukth/exjobb/rapportllistor/2008/rapporter08/karlsson_kristofer_08073.pdf>;pp. 1-30.*

Frank Tip, Peter F. Sweeney, "Practical Extraction Techniques for Java", ACM, 2002; [retrieved on Nov. 7, 2011]; Retrieved from Internet <URL:http://dl.acm.org/citation.cfm?id=586090>; pp. 625-666.*

Rayside, et al., "Compact Java Binaries for Embedded Systems", Proceedings fo the 1999 conference of the CASCR; [retrieved on Nov. 7, 2011]; Retrieved from Internet <URL:http://dl.acm.org/citation.cfm?id=782004>; pp. 1-13.*

Clausen, et al., "Java Bytecode Compression for Low-End Embedded Systems", ACM 2000; [retrieved on Nov. 7, 2011]; Retrieved from Internet <URL:http://dl.acm.org/citation.cfm?id=353933>; pp. 471-489.*

Microsoft Press, "Computer Dictionary", 2002, Microsoft Corporation; pp. 117.*

Li, Lu, "Automatic Camera Calibration Technique and its Application in Virtual Advertisement Insertion System"; 2007 IEEE; [retrieved on Feb. 20, 2014]; Retrieved from Internet <http://ieeexplore.ieee.org/stamp/stamp.jsp?tp=&arnumber=431841>;pp. 288-292.*

Khan, et al., "CAMEO:AMiddleware for Mobile Advertisement Delivery"; 2013 ACM; [retrieved on Feb. 20, 2014]; Retrieved from Internet <http://dl.acm.org/citation.cfm?id=2462456>;pp. 125-137.*

Hao, et al.,"SIF: A Selective Instrumentation Framework for Mobile Applications"; 2013 ACM; [retrieved on Feb. 20, 2014]; Retrieved from Internet <http://dl.acm.org/citation.cfm?id=2462456>;pp. 167-180.*

Deng, Chi, "Local Web Advertisement Through Dynamic Active Proxy"; 2000 IEEE[retrieved on Feb. 20, 2014]; Retrieved from Internet <http://ieeexplore.ieee.org/stamp/stamp.jsp?tp=&arnumber=871572>;pp. 1183-1186.*

"J2ME Optimization Suite mBooster", Jun. 3, 2007, http://innaworks.com/mbooster.hmtl, Printed Feb. 14, 2008, 2 Pages.

International Search Report from PCT/US2009/031006 dated Jul. 24, 2009.

Written Opinion from from PCT/US2009/031006 dated Jul. 24, 2009.

KR patent application No. 10-2010-7020488, Notice of Preliminary Rejection mailed Jan. 16, 2012.

* cited by examiner

EFFICIENT COMPRESSION OF APPLICATIONS

BACKGROUND OF THE INVENTION

1. Field of the Invention

The present invention relates to software applications. More particularly, the present invention relates to the efficient compression of applications.

2. Description of the Related Art

Certain computing devices can be very resource-limited. Common examples include mobile devices such as mobile phones and personal digital assistants (PDAs). For example, a mobile device that supports Java applications may only allow installation of Java applications up to a given size. Java applications comprise multiple files that are distributed in a compressed container file (a compressed file known as a Java ARchive, or JAR file). The JAR file contains the class and data files for a Java application. The JAR format is based on the popular ZIP file format. Efficient JAR compression is highly desirable as it reduces the amount of bandwidth taken to download a Java application and also reduces the application's footprint on the device upon which it is operated.

Suppose that a device has a JAR size limit of 300 kilobytes. Suppose further that the files of an application amount to 500 kilobytes but when compressed into a JAR file result in a size of only 300 kilobytes. Thus, the device will accept the compressed application. This yields a compression ratio of 500/300 or 5/3. If the compression ratio were better, say 2/1, then an extended version of the application, e.g., a version that adds advertising, could be created that takes up 600 kilobytes, as that application could still be compressed to 300 kilobytes. A more efficient compression algorithm could be employed to achieve a better compression ratio. This, however, would break device compatibility as the target device would only support the standard JAR compression algorithm and thus would not be able to uncompress any data output by the more efficient algorithm. Hence, improving the compression ratio of the standard JAR compression algorithm is preferable.

SUMMARY OF THE INVENTION

In one embodiment, a method for inserting advertising into an application includes removing first application code from a first input executable file and placing it into an output executable file, wherein the first application code represents part of the application. Then a first set of proxies is inserted into the first input executable file, wherein the first set of proxies, when run, makes calls to the first application code. Second application code is added into the output executable file, wherein the second application code represents code executable to display the advertising. The output executable file is compressed. Then, the first input executable file and the output executable file are provided to a device such that the device may load and execute the files.

DETAILED DESCRIPTION OF SPECIFIC EMBODIMENTS

Figure 1:
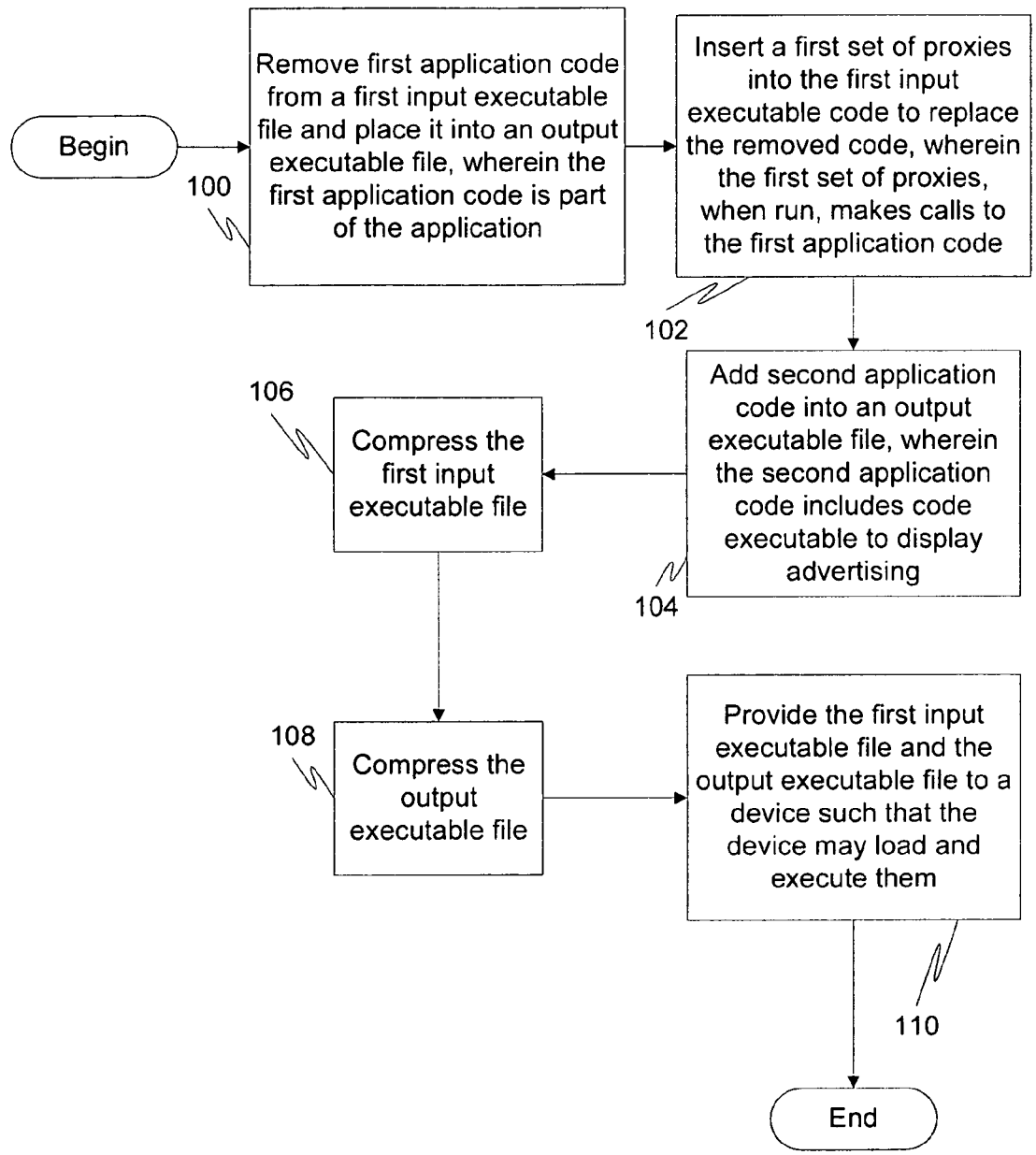
FIG. 1 is a flow diagram illustrating a method for inserting advertising into an application in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In an embodiment of the present invention, advertising is injected into applications comprising one or more individually compressed executable files. For example, in the case of a Java application, the advertising may be injected into a JAR file. When the user starts the Java application, for example, on a mobile phone, an advertising message may appear before, during, or after the application runs. In one example, the advertising appears as a short video similar to a commercial. In another example, the advertising appears as graphical advertising during the operation of the application itself, such as a banner advertisement along a top or bottom of an application.

In the case where the application is a game program, the advertisement may appear embedded into the game experience itself. Thus, for example, if the game involves a character running through a city, the advertisement may appear as graphical advertisements on the sides of buildings in the city.

The advertising may be rendered by Java code that is added to the JAR of the application and that is hooked into the application's code. As a result of this added code, however, the collection of compressed application files represented by the JAR may grow beyond the maximal JAR size supported by the device. For example, if a device had a JAR size limit of 300 kilobytes and the original JAR file already was 300 kilobytes in size, then adding 20 kilobytes of advertising code would cause the device to be unable to run the resulting advertising enabled Java application.

As such, an embodiment of the present invention exploits the fact that large files in general compress better than small files. Suppose that there are files A, B, and C that are similar in content. File X may be a concatenation of files A, B, and C. Thus, the size of X is simply the sum of the sizes of files A, B, and C. However, the size of compressed file X' is smaller than the sums of the sizes of compressed files A', B', and C'. This is because compression involves eliminating redundancy. Since A, B, and C are similar in content, then parts of A will also be present in B and C. So A, B, and C taken together contain more redundancy than A, B, and C each taken alone.

Compressed application files, such as JAR files, often contain a number of files, each file compressed separately. Many of the files in the Java application example are java class files, i.e., the file are similar in content. As such, an embodiment of the present invention combines large parts of each Java class file of the application as well as large parts of each Java class file that contains the code to display the advertising into a single class file.

Suppose there are two input class files, A and B. For the sake of simplicity, assume that A only contains a single method Method-A that contains a number x of instructions:

```
Method-A( )
{
    Instruction-A-1;
    Instruction-A-2;
    ...
    Instruction-A-x;
}
```

B contains another single method, here Method-B containing a number y of instructions:

```
Method-B( )
{
    Instruction-B-1;
    Instruction-B-2;
    ...
    Instruction-B-y;
}
```

An embodiment of the present invention would then create a new class X that contains both methods. Thus X would look like the following:

```
Method-A( )
{
    Instruction-A-1;
    Instruction-A-2;
    ...
    Instruction-A-x;
}
Method-B( )
{
    Instruction-B-1;
    Instruction-B-2;
    ...
    Instruction-B-y;
}
```

In order to keep the functionality of the code, an embodiment of the present invention would keep the input class files but replace the original methods by proxies. For this it would rewrite Method-A in class file A and Method-B in class file B to invoke Method-A and Method-B in the combined class file X, respectively. Rewritten file A would then appear as follows:

```
Method-A( )
{
    X.Method-A( );
}
```

Whereas rewritten file B would appear as follows:

```
Method-B( )
{
    X.Method-B( );
}
```

The present invention may be extended to cover any number of input class files. Moreover, it is also applicable to the class files that display the advertising.

After creation of an output class file, the contained code copied from the input class files of the application is instrumented to make calls to the code copied from the class files that display the advertising. Thus the calls trigger the advertisement rendering at the desired location in the application and the desired point in time in the application lifecycle. As an example, the current state of the art comprises methods based on control-flow and data-flow analysis that could be adapted to accomplish this transformation.

Improving the compression ratio of compressed executable files allows the code that is added to the original application to display the advertising to be richer in functionality. One way to exploit this is to improve the robustness of advertising rendering. While many mobile devices impose a limit on the size of an installable application, resource constraints also appear at application runtime. Typically the amount of available heap memory is low and the CPU that executes the application is not very powerful. This, it can be important for the displaying of the advertisement not to compete with the original application for scarce resources such as heap memory or CPU cycles.

When showing an advertisement at the beginning of an application, the newly inserted code responsible for rendering the advertisement would execute before any other code, free all resources that it requires, and then invoke the code of the original application. Showing the advertisement at the end of an application, however, can be more of a challenge. In this case, the code that exits the original application would be replaced by code that, instead, triggers rendering an advertisement. However, at this point in time, the application may still hold resources, e.g., its threads may still be running in the background or memory may still be allocated, because applications usually rely on resources to be reclaimed automatically by the operating system when they exit. Therefore, it is advisable to add code to the original application that tracks resource usage and releases any allocated resources before an advertisement is shown at the end of the application.

Another way to leverage the added code is to augment the user experience. Without the disclosed optimization, an application may only have space left for code that renders simple advertisements that merely comprise a static image. Additional space could allow for the addition of code that implements a virtual machine. The rendering of an advertisement would then equal interpreting a program. The advertising designer would author the advertising program in a programming language that specifically targets the creation of advertisements, e.g., by supplying commands to display, scale, rotate, or move images, play sounds, etc. Moreover, interactivity could be supported by programming language constructs that conditionally execute code in response to user input.

Richer functionality could also encompass an implementation of digital rights management (DRM) as a complement to rendering advertising in the application. DRM may be used, for example, to force the user to connect to the Internet and download new advertising every ten plays. Alternatively, it could limit the number of times that a user can play an advertising-funded version of a game. After the limit is reached, the user would have to obtain a fully paid version of the game to continue playing.

As an additional service to the author of the original application, code could be added that intercepts a crash of the application, collects information about the state of the application at the time of the crash, and transmits the information via the Internet to a server. The author of the application could then access the information and gain insight into the reason behind the crash. Alternatively, the information could be stored on the device and be transmitted only at a later point in time, as the device may not be in a stable condition immediately after an application crash.

FIG. 1 is a flow diagram illustrating a method for inserting advertising into an application in accordance with an embodiment of the present invention. Each step of the method may be embodied in hardware, software, or any combination thereof. At 100, first application code is removed from a first input executable file and placed into an output executable file, wherein the first input executable is part of the application. At 102, a first set of proxies is inserted into the first input executable file to replace the removed code, wherein the first set of proxies, when run, makes calls to the first application code (now located in the output executable file). At 104, second application code is added into the output executable file, wherein the second application code includes code executable to display advertising and the second application code is external to the application. At 106, the first input executable file is compressed. At 108, the output executable file is compressed. At 110, the first input executable file and the output executable file are provided to a device such that the device may load and execute them. For example, the first executable file and the output executable file may be downloaded by a client computer and loaded onto a storage device accessible by a processor. The first input executable file and the output executable file may be, for example, JAR files, in a Java application scenario. The device may be a mobile device, such as a mobile phone or personal digital assistant. The device may be resource-limited such that if the first application code were placed in a first compressed file and the second application code were placed in a second compressed file then the device would not be able to run the first and second compressed files. The resulting file then yields a better compression ratio than the original files, because combining the code into a single output file results in more redundancy per file, which will be taken advantage of by a JAR or JAR-like compression scheme, i.e., a scheme that processes each file separately from other files.

Figure 2:
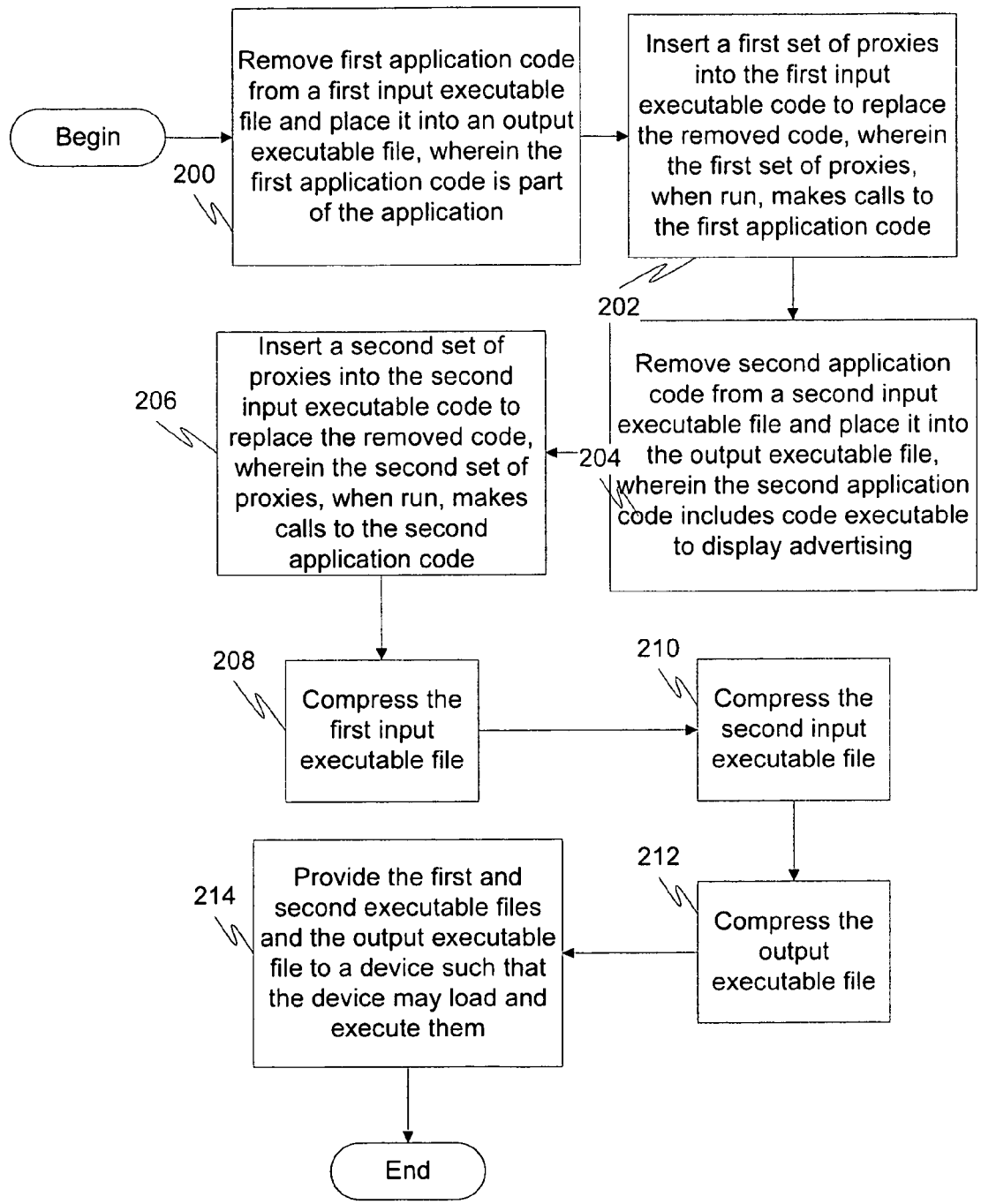
FIG. 2 is a flow diagram illustrating a method for inserting advertising into an application in accordance with another embodiment of the present invention.

FIG. 2 is a flow diagram illustrating a method for inserting advertising into an application in accordance with another embodiment of the present invention. Each step of the method may be embodied in hardware, software, or any combination thereof. At 200, first application code is removed from a first input executable file and placed into an output executable file, wherein the first input executable file is part of the application. At 202, a first set of proxies is inserted into the first input executable file to replace the removed code, wherein the first set of proxies, when run, makes calls to the first application code (now located in the output executable file). At 204, second application code is removed from a second input executable file and placed into the output executable file, wherein the second application code includes code executable to display advertising and the second input executable file is external to an application. At 206, a second set of proxies is inserted into the second input executable file to replace the removed code, wherein the second set of proxies, when run, makes calls to the second application code (now located at in the output executable file). At 208, the first input executable file is compressed. At 210, the second input executable file is compressed. At 212, the output executable file is compressed. At 214, the first and second input executable files and the output executable file are provided to a device such that the device may load and execute them. For example, the first and second input executable files and the output executable file may be downloaded by a client computer and loaded onto a storage device accessible by a processor. The first and second input executable files and the output executable file may be, for example, JAR files, in a Java application scenario. The device may be a mobile device, such as a mobile phone or personal digital assistant. The device may be resource-limited such that if the first application code were placed in a first compressed file and the second application code were placed in a second compressed file then the device would not be able to run the first and second compressed files. The resulting file then yields a better compression ratio than the original files, because combining the code from the original input files into a single output file results in more redundancy per file, which will be taken advantage of by a JAR or JAR-like compression scheme, i.e., a scheme that processes each file separately from other files.

Figure 3:
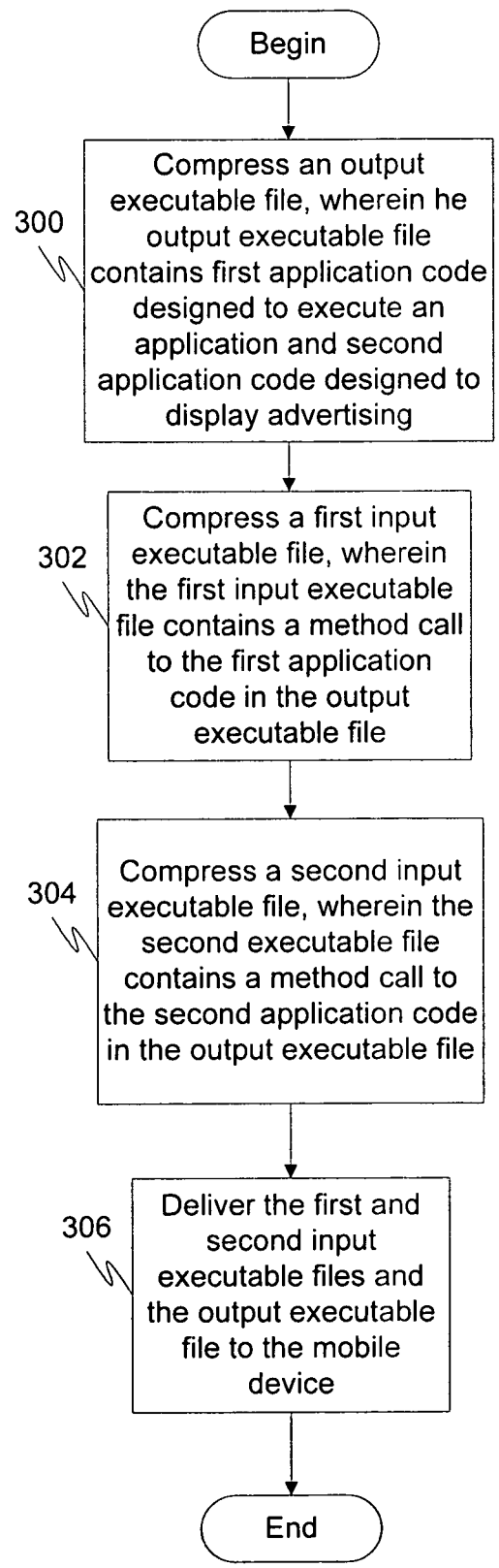
FIG. 3 is a flow diagram illustrating a method for delivering advertising to a mobile device in accordance with another embodiment of the present invention.

FIG. 3 is a flow diagram illustrating a method for delivering advertising to a mobile device in accordance with another embodiment of the present invention. Each step of the method may be embodied in hardware, software, or any combination thereof. At 300, an output executable file is compressed, wherein the output executable file contains first application code designed to execute an application and second application code designed to display advertising. At 302, a first input executable file is compressed, wherein the first input executable file contains a method call to the first application code in the output executable file. At 304, a second input executable file is compressed, wherein the second input executable file contains a method call to the second application code in the output executable file. The first and second input executable files and the output executable file may be, for example, JAR files, in a Java application scenario. At 306, the first and second input executable files and the output executable file are delivered to the mobile device. For example, the first and second input executable files and the output executable file may be downloaded by a client computer and loaded onto a storage device accessible by a processor. The device may be, for example, a mobile phone or personal digital assistant. The device may be resource-limited such that if the first application code were placed in a first compressed file and the second application code were placed in a second compressed file then the device would not be able to run the first and second compressed files.

Figure 4:
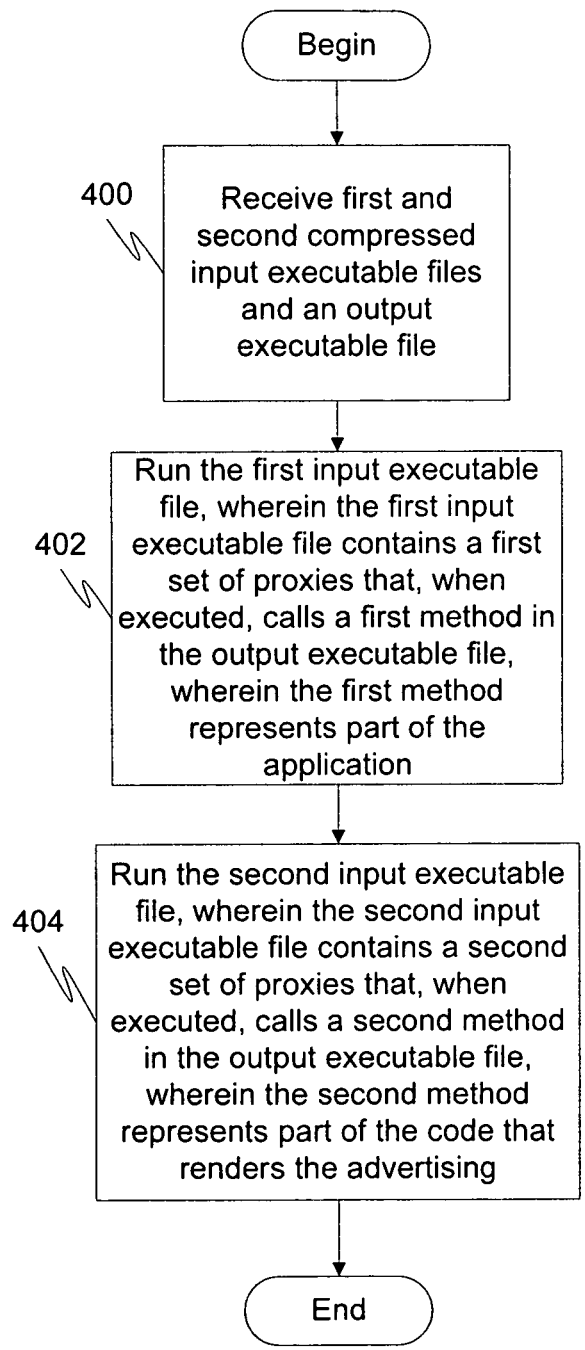
FIG. 4 is a flow diagram illustrating a method for running an application with advertising on a mobile device in accordance with another embodiment of the present invention.

FIG. 4 is a flow diagram illustrating a method for running an application with advertising on a mobile device in accordance with another embodiment of the present invention. Each step of the method may be embodied in hardware, software, or any combination thereof. At 400, a first and second compressed input executable files and a compressed output executable file may be received. It should be noted that despite these three files being described in a single step, in practice and for purposes of interpretation of the claims, the first and second compressed input executable files and the compressed output executable file may be received at different times and/or in different transactions. At 402, the first input executable file is run, wherein the first input executable file contains a first set of proxies that, when executed, calls a first method in the output executable file, wherein the first method represents part of the application. At 404, the second input executable file is run, wherein the second input executable file contains a second set of proxies that, when executed, calls a second method in the output executable file, wherein the second method represents part of the code that renders the advertising. It should be noted that the phrase "part of the application" shall be interpreted to mean any portion of the application, including the entire application itself. In other words, when the second method is run, the advertising is displayed to the user. The device may be, for example, a mobile phone or personal digital assistant. The device may be resource-limited such that if the first application code were placed in a first compressed file and the second application code were placed in a second compressed file then the device would not be able to run the first and second compressed files.

Figure 5:
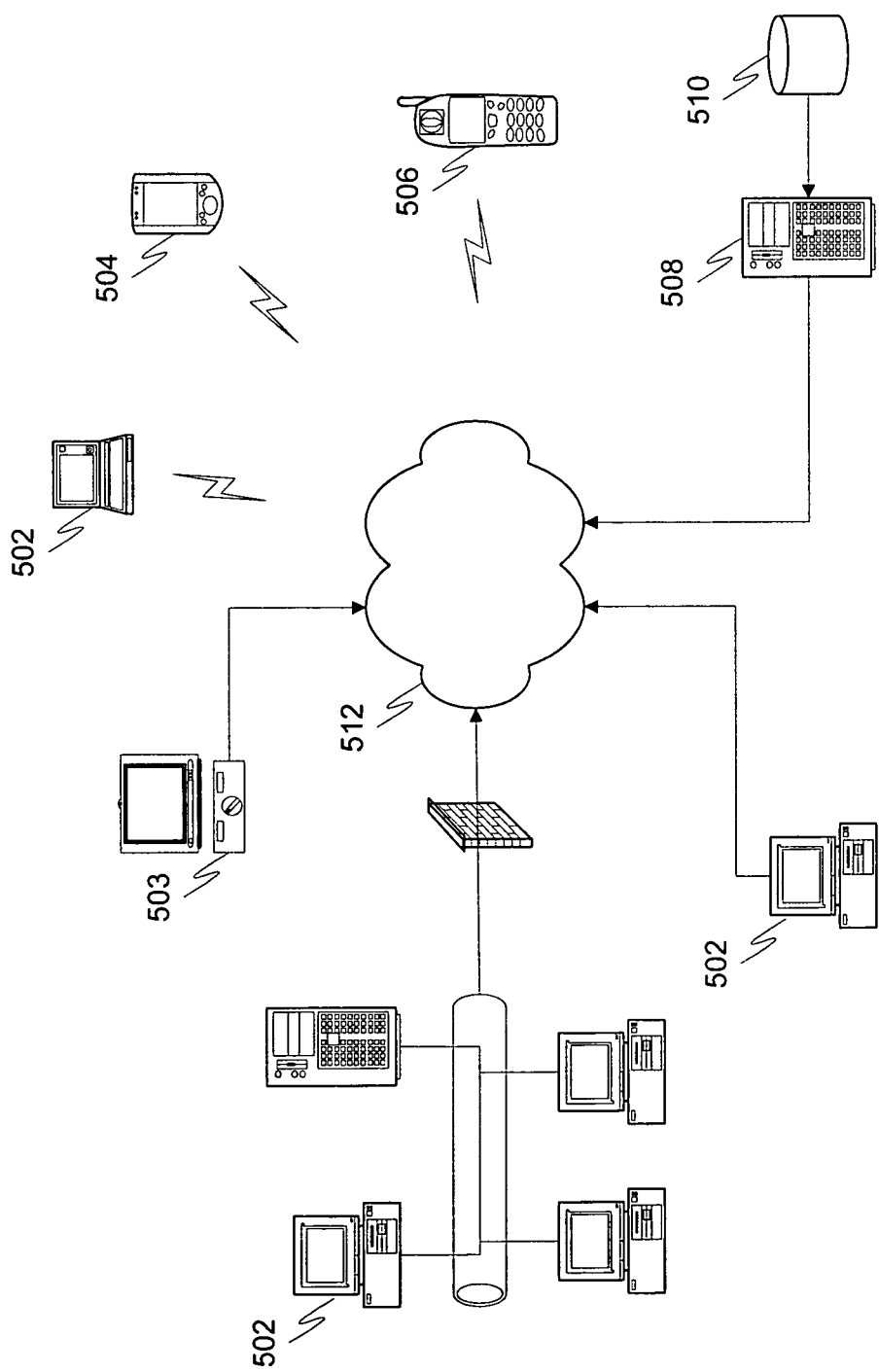
FIG. 5 is an exemplary network diagram illustrating some of the platforms that may be employed with various embodiments of the invention.

It should also be noted that embodiments of the present invention may be implemented on any computing platform and in any network topology in which presentation of service results is a useful functionality. For example and as illustrated in FIG. 5, implementations are contemplated in which the invention is implemented in a network containing personal computers 502, media computing platforms 503 (e.g., cable and satellite set top boxes with navigation and recording capabilities (e.g., Tivo)), handheld computing devices (e.g., PDAs) 504, cell phones 506, or any other type of portable communication platform. Users of these devices may navigate the network and request from a proxy server that a video be streamed. A user may utilize a mobile device such as 504 and 506 to perform client-side macros and/or to request that a server run server-side macros. Proxy Server 508 (or any of a variety of computing platforms) may include a memory, a processor, and a communications component and may then utilize the various techniques described above. The processor of the proxy server 508 may be configured to run, for example, all of the processes described in FIGS. 1-4. Server 508 may be coupled to a database 510, which stores information relating to the compression of the files. Applications may be resident on such devices, e.g., as part of a browser or other application, or be served up from a remote site, e.g., in a Web page. The invention may also be practiced in a wide variety of network environments (represented by network 512), e.g., TCP/IP-based networks, telecommunications networks, wireless networks, etc. The invention may also be tangibly embodied in one or more program storage devices as a series of instructions readable by a computer (i.e., in a computer readable medium).

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method, comprising:
    removing first application code from a first input executable file and placing it into an output executable file, the first application code being a part of an application;
    inserting a first set of proxies into the first input executable file, wherein the first set of proxies, when run, makes calls to the first application code;
    adding second application code into the output executable file, wherein the second application code represents code executable to display advertising, and wherein the second application code is external to the application;
    compressing the output executable file after performing the removing the first application code from the first input executable file and placing it into the output executable file, inserting the first set of proxies into the first input executable file, and adding the second application code into the output executable file; and
    providing the first input executable file and the output executable file to a device such that the device may load and execute the first input executable file and the output executable file.

2. The computer-implemented method of claim 1, wherein the device is a mobile phone.

3. The computer-implemented method of claim 1, wherein the device is a personal digital assistant.

4. The computer-implemented method of claim 1, further comprising compressing the first input executable file prior to the providing.

5. The computer-implemented method of claim 1, wherein the first input executable file and the output executable file comprise Java ARchive files (JAR) files.

6. The computer-implemented method of claim 1, wherein the first application code comprises a first method, the second application code comprises a second method, wherein the output executable file comprises a class file, wherein removing first application code from a first input executable file and placing it into an output executable file comprises placing the first method in the class file, and wherein adding second application code into the output executable file comprises adding the second method into the class file.

7. The computer-implemented method of claim 6, wherein providing the first input executable file and the output executable file to a device such that the device may load and execute the first input executable file and the output executable file comprises:
    providing a compressed container file including the first input executable file and the output executable file.

8. The computer-implemented method of claim 6, wherein the class file comprises a Java class file.

9. The computer-implemented method of claim 1, wherein providing the first input executable file and the output executable file to a device such that the device may load and execute the first input executable file and the output executable file comprises:
    providing a compressed container file including the first input executable file and the output executable file.

10. The computer-implemented method of claim 1, wherein the output executable file comprises a Java class file.

11. The computer-implemented method of claim 1, wherein adding the second application code into the output executable file is performed such that, when the output executable file is executed, the second application code is executed after the first application code.

12. A computer-implemented method, comprising:
    removing first application code from a first input executable file and placing it into an output executable file, the first application code being part of an application;
    inserting a first set of proxies into the first input executable file, wherein the first set of proxies, when run, makes calls to the first application code;
    removing second application code from a second input executable file and placing it into the output executable file, wherein the second application code represents code executable to display advertising, and wherein the second application code is external to the application;

inserting a second set of proxies into the second input executable file, wherein the second set of proxies, when run, makes calls to the second application code;

compressing the output executable file after removing the first application code from the first input executable file and placing it into the output executable file and removing the second application code from the second input executable file and placing it into the output executable file; and providing the first and second input executable files and the output executable file to a device such that the device may load and execute the first and second input executable files and the output executable file.

13. The computer-implemented method of claim 12, wherein the second set of proxies, when run, makes calls to the second application code such that the second application code is executed after execution of the first application code is completed, the method further comprising:

releasing resources after the first application code is executed and prior to execution of the second application code.

14. A computer-implemented method, comprising:

compressing an output executable file, wherein the output executable file contains first application code designed to execute an application and second application code designed to display advertising, the second application code being external to the application, wherein the first application code and the second application code are not compressed prior to compressing the output executable file;

compressing a first input executable file, wherein the first input executable file contains a method call to the first application code in the output executable file;

compressing a second input executable file, wherein the second input executable file contains a method call to the second application code in the output executable file; and delivering the first and second input executable files and the output executable file to a mobile device.

15. A method, comprising:

receiving, at a mobile device, a compressed first input executable file, a compressed second input executable file, and a compressed output executable file, wherein the output executable file includes first application code designed to execute an application and second application code designed to render advertising;

running, at the mobile device, the first input executable file, wherein the input executable file contains a first set of proxies that, when executed, calls the first application code in the output executable file; and after execution of the first input executable file is completed, running, at the mobile device, the second input executable file, wherein the second input executable file contains a second set of proxies that, when executed, calls the second application code in the output executable file.

16. An apparatus, comprising:

an interface; and one or more processors configured to perform the following steps:

compress an output executable file, wherein the output executable file contains first application code designed to execute an application and second application code designed to display advertising, the second application code being external to the application, wherein the first application code and the second application code are uncompressed prior to compressing the output executable file;

compress a first input executable file, wherein the first input executable file contains a method call to the first application code in the output executable file;

compress a second input executable file, wherein the second input executable file contains a method call to the second application code in the output executable file; and delivering the compressed first and second input executable files and the compressed output executable file to a mobile device.

17. The apparatus of claim 16, wherein the device is a mobile phone.

18. The apparatus of claim 16, wherein the device is a personal digital assistant.

19. A mobile device comprising:

an interface; and one or more processors configured to perform the following steps:

receiving a compressed first and second input executable file, and a compressed output executable file, wherein the output executable file includes first application code designed to execute an application and second application code designed to render advertising;

running the first input executable file, wherein the input executable file contains a first set of proxies that, when executed, calls the first application code in the output executable file; and after execution of the first input executable file is completed, running the second input executable file, wherein the second input executable file contains a second set of proxies that, when executed, calls the second application code in the output executable file.

20. A non-transitory computer-readable storage medium storing thereon instructions executable by a machine to perform a method comprising:

compressing an output executable file, wherein the output executable file contains first application code designed to execute an application and second application code designed to display advertising, the second application code being external to the application, wherein the first application code and the second application code are uncompressed prior to compressing the output executable file;

compressing a first input executable file, wherein the first input executable file contains a method call to the first application code in the output executable file;

compressing a second input executable file, wherein the second input executable file contains a method call to the second application code in the output executable file; and delivering the first and second input executable files and the output executable file to a mobile device.

21. The non-transitory computer-readable storage medium of claim 20, wherein the second input executable file contains a method call to the second application code in the output executable file such that the second application code is executed after execution of the first application code is completed.

22. A non-transitory computer-readable storage medium storing thereon instructions executable by a machine to perform a method comprising:

receiving, at a mobile device, a compressed first and second input executable file, and a compressed output executable file, wherein the output executable file includes first application code designed to execute an application and second application code designed to render advertising;

running the first input executable file at the mobile device, wherein the input executable file contains a first set of proxies that, when executed, calls the first application code in the output executable file; and after execution of the first input executable file is completed, running the second input executable file at the mobile device, wherein the second input executable file contains a second set of proxies that, when executed, calls the second application code in the output executable file.

* * * * *